UNITED STATES PATENT OFFICE.

A. J. WOODWORTH, OF HENRICO COUNTY, VIRGINIA.

IMPROVEMENT IN SOAP.

Specification forming part of Letters Patent No. 27,496, dated March 13, 1860.

*To all whom it may concern:*

Be it known that I, A. J. WOODWORTH, of Henrico county and State of Virginia, have invented a new and useful Improvement in the Manufacture of Washing and Toilet Soaps; and I do hereby declare that the following is a full, clear, and exact description of the same.

The nature of my invention consists in the manufacture of toilet and washing soaps by the combination of ingredients hereinafter specified.

In making my washing-soap I mix, for fifteen pounds of common or soda washing-soap, one gallon and a half of soft water, and one-half ounce of spirits of hartshorn, one-half pound of sal-soda, one tea-spoonful of spirits of wine, and two pounds of bleaching-soap.

To manufacture my toilet-soap I mix together in addition to the ingredients specified for washing-soap, four pounds of bleaching-soap, and I diminish the quantity of sal-soda by one-fourth. These are to be mixed together in the usual manner to combine them perfectly.

The article termed "bleaching-soap" herein, is one well known in the trade, and made commonly by manufacturers of soap.

It will be seen from the above formula that it is only in the proportion of the ingredients that the two varieties of soap herein described differ. I do not claim the proportions in which they are united; but

What I claim as my invention, and desire to secure by Letters Patent, as an article of manufacture, is—

A compound soap which has for one of its ingredients bleaching-soap, and which is made substantially of the ingredients hereinbefore set forth, in the proportions specified.

A. J. WOODWORTH.

Attest:
JOHN S. HOLLINGSHEAD,
JAMES LITTLE.